United States Patent
Kim et al.

(10) Patent No.: US 6,577,873 B1
(45) Date of Patent: Jun. 10, 2003

(54) APPARATUS AND METHOD FOR EXTENDING SERVICE AREA IN MOBILE COMMUNICATION SYSTEM

(75) Inventors: Hong Kim, Kyoungki-do (KR); Ik Beom Lee, Seoul (KR)

(73) Assignee: Hyundai Electronic Ind. Co., Ltd., Kyoungki-do (KR)

( * ) Notice: Subject to any disclaimer, the term of this patent is extended or adjusted under 35 U.S.C. 154(b) by 0 days.

(21) Appl. No.: 09/521,863

(22) Filed: Mar. 8, 2000

(30) Foreign Application Priority Data

Mar. 25, 1999 (KR) .............................. 99-10324

(51) Int. Cl.[7] .............................. H04Q 7/20; H04B 1/38
(52) U.S. Cl. ..................... 455/503; 455/504; 455/67.1; 375/355; 375/356
(58) Field of Search ........................ 455/69, 503, 504, 455/68, 67.1; 375/355, 356

(56) References Cited

U.S. PATENT DOCUMENTS

| | | |
|---|---|---|
| 5,475,870 A | 12/1995 | Weaver, Jr. et al. |
| 5,802,044 A * | 9/1998 | Baum et al. ................ 370/330 |
| 5,841,767 A | 11/1998 | Nishi et al. |
| 5,850,593 A | 12/1998 | Uratani |
| 6,332,079 B1 * | 12/2001 | Kim et al. .................. 455/446 |
| 6,374,078 B1 * | 4/2002 | Williams et al. ............... 455/7 |
| 6,421,330 B1 * | 7/2002 | Chung et al. ............... 370/335 |

* cited by examiner

Primary Examiner—Thanh Cong Le
Assistant Examiner—Alan T. Gantt
(74) Attorney, Agent, or Firm—R. Neil Sudol; Henry D. Coleman; William J. Sapone

(57) ABSTRACT

An apparatus and method for extending the service area in a mobile communication system is provided, in which the service area is defined with a normal mode or an extension mode based on a distance between the base station and the mobile station and, in case of the extension mode, a transmission clock used by the mobile station for transmitting signals is changed, thus extending the service area. The access is attempted in the normal mode, and the transmission clock for transmitting the mobile signal is advanced the initial delay in the extension mode when the access fails. The access is reattempted with repeating the control of the transmission clock until the number of times of the access attempt reaches a predetermined number of times. When the number of times of the access currently attempted is greater than the predetermined number of times, the extension mode is converted to the normal mode, returning to the initial state.

10 Claims, 3 Drawing Sheets

APPARATUS AND METHOD FOR EXTENDING SERVICE AREA IN MOBILE COMMUNICATION SYSTEM

BACKGROUND OF THE INVENTION

1. Field of the Invention

The present invention relates to the extension of the service area in a code division multiple access (CDMA) mobile communication system and, more particularly, to an apparatus and method for extending the service area in a mobile communication system, in which the service area is defined with a normal mode or an extension mode based on a distance between the base station and the mobile station and, in case of the extension mode, a transmission clock used by the mobile station for transmitting signals is changed, thus extending the service area.

2. Discussion of Related Art

In general, all the base stations of a digital mobile communication system (digital cellular mobile communication system or personal communication system) employing CDMA mode synchronize with the CDMA system reference time. Its mobile stations also synchronize with the CDMA system reference time using time information supplied by the base stations. Here, the base station acquires the system reference time using the GPS time while the mobile station synchronizes with the base station using the time information transmitted therefrom. Accordingly, the reference time of the mobile station is delayed by the propagation delay time during which the time information is sent from the base station to the mobile station. The degree of this delay depends on the relative distance between the mobile and base station and surrounding environments.

The mobile station uses an access channel to have access the base station system located in a corresponding coverage area. The access channel is composed of access channel slots and used when the mobile is registered to the base station through the backward channel or requires a call. Here, a single access channel slot is allocated for a single access channel message transmission. This access channel message consists of four frames (20 ms) minimum to twenty-six frames maximum based on its length, and uses an appropriate value according to systems. The access channel message transmits a message frame, being synchronized with the point of time at which the slot starts, and sends the next message frame after the slot starts. Thus, the boundary of the access channel slot coincides with that of the frame.

Meanwhile, the mobile transmits an origination message using the access channel when it attempts to have access the base station system located in the coverage area. At this time, a single access channel slot is used for a single origination message transmission. The origination message includes information on the mobile (mobile device number, mode indicating whether the mobile is in the CDMA dedicated mode or dual mode, and class indicating whether the device is the PCS or cellular phone) and terminating numbers. When the mobile receives the acknowledge, for the origination message transmitted through the access channel, from the base station system within a predetermined period time, the attempt to have access the system is successively terminated. However, when the mobile does not receive the acknowledge from the system within the predetermined period of time, it retransmits the origination message and waits for the acknowledge. If the mobile did not acquire the acknowledge again, it attempts to retransmit the origination message one more time. The number of times of retransmission is predetermined (it is decided by the sum of Num_Step and Max_Req_Seq in the access parameter message sent from the base station to the mobile station) and, if the mobile does not receive the acknowledge from the system even when it performs retransmission a predetermined number of times, the attempt to access the system is finished, being failed.

Accordingly, the base station continuously monitors the access channel because it does not know when the mobile attempts the access. Here, it is inefficient to search for the access signal continuously because the mobile transmits the message using the access channel slot, and it is the most efficient for capture of the signal from the mobile to search for the access signal from the mobile within a predetermined period time during which the access signal can arrive at every frame boundary of 20 ms. The period of time during which the base station search for the access signal sent from the mobile is called "search window". This search window is determined with regard to the propagation delay according to the service area of the base station and the basic processing delay, the service area of the base station being decided at the stage of designing and optimizing the base station. The service area of each base station can be appropriately adjusted according to surrounding environments, neighboring base stations or population density. For example, the service area is defined small (for instance, 1–3 km approximately) when the base station is located in an area where population density is higher and there are lots of neighboring buildings, while it is decided wide (for instance, 20–30 km approximately) when the base station is placed in an area where the population density is lower and there is barely building.

Meantime, the period of time during which the access signal of the mobile can arrive at the base station is calculated as below. The period of time during which the access signal can reach the base station becomes the minimum when the mobile is placed right next to the base station (when there is no aerial propagation delay) This period of time corresponds to the sum of the transmission delay of the base station, the processing delay of the mobile and the reception delay of the base station. Furthermore, the period of time during which the access signal can arrives at the base station becomes the maximum when the mobile is located at the outmost region of the service area of the base station. This period of time corresponds to the sum of the minimum period of time and double of the aerial propagation delay. Here, the aerial propagation delay is doubled because the mobile sends the signal to the base station on the basis of the time information of the base station. The actual period of time that the mobile acquired corresponds to the delay time between the base station and the mobile. Accordingly, the period of time during which the signal reaches the base station when the mobile attempts to have access it should be the sum of the delay time during which the time information is sent to the mobile from the base station and the delay time during which the signal is transmitted from the mobile to the base station. This is the reason why the aerial propagation delay is also called the round trip delay (RTD).

Meanwhile, when the mobile sends the originating message, the preamble as many as numbers decided by its operator is transmitted first, and the base station channel element starts demodulation using this preamble. Here, the maximum allowable delay in the mobile signal sent to the base station is determined according to the size of the window set in the base station. When the preamble is searched, for instance, the search is carried out from the place distant from the system time (access channel slot) by preamble_PN_offset to preamble_window_length+ preamble_PN_offset in response to Half PN chip. Accordingly, the base station sets PN offset to the maximum correlation value among correlation results as many as (preamble_window_length)/4.

However, the aforementioned conventional mobile communication system cannot process a signal having a delay of two Walsh symbols or more in terms of the chip characteristic of cell site modem (CSM). That is, when the signal from the mobile arrives at the base station, being delayed more than two Walsh symbols, the base station cannot receive the signal. Here, the delay of two Walsh symbols means an area where the basic communication can be actually carried out.

SUMMARY OF THE INVENTION

Accordingly, the present invention is directed to an apparatus and method for extending the service area in a mobile communication system that substantially obviates one or more of the problems due to limitations and disadvantages of the related art.

An object of the present invention is to provide an apparatus and method for extending the service area in a mobile communication system, in which the service area is defined with a normal mode or an extension mode based on a distance between the base station and the mobile station and, in case of the extension mode, a transmission clock used by the mobile station for transmitting signals is changed, thus extending the service area.

To accomplish the object of the present invention, there is provided an apparatus for extending the service area in a mobile communication system, comprising: means for generating a clock required for receiving a signal from a base station and transmitting a signal from a mobile station; means for receiving the signal transmitted from the base station; and means for variably controlling the clock generated by the clock generating means according to the signal received by the receiving means, and sending the controlled clock to means for transmitting the signal from the mobile station.

The normal mode is an operation mode in case that the distance between the base station and mobile station is included in a basic coverage area, and the extension mode is an operation mode in case that the distance between the base station and mobile station is not included therein.

To accomplish the object of the present invention, there is also provided a method for extending the service area in a mobile communication system, wherein a method of accessing a base station of a CDMA mobile communication system comprises: a first step of attempting access in the normal operation mode; a second step of performing a predetermined following operation when the access is successful, and converting the operation mode to the extension mode when the access fails; a third step of varying a transmission clock by a predetermined level after the operation mode is converted to the extension mode, and attempting the access again; and a fourth step of carrying out a predetermined following operation when the access is successful in the third step, converting the operation mode to the normal mode when the access fails after the access is attempted a predetermined number of times and returning to the initial state.

The third step comprises the substeps of: controlling the mobile signal transmitting clock to be advanced by the initial delay time; reattempting the access with the controlled transmission clock, and comparing the number of times of that access attempts that have been made so far with a predetermined number of times of access attempt when the access fails; controlling the transmission clock to be advanced by a predetermined level by steps when the number of times of the access attempts that have been made so far is less than the predetermined number of times, and then reattempting the access with the controlled transmission clock; and repeating the control of the transmission clock's level and access attempt until the number of times of the access attempts becomes the predetermined number times when the reattempted access fails.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention:

DETAILED DESCRIPTION OF PREFERRED EMBODIMENT

Reference will now be made in detail to the preferred embodiments of the present invention, examples of which are illustrated in the accompanying drawings.

Figure 1:
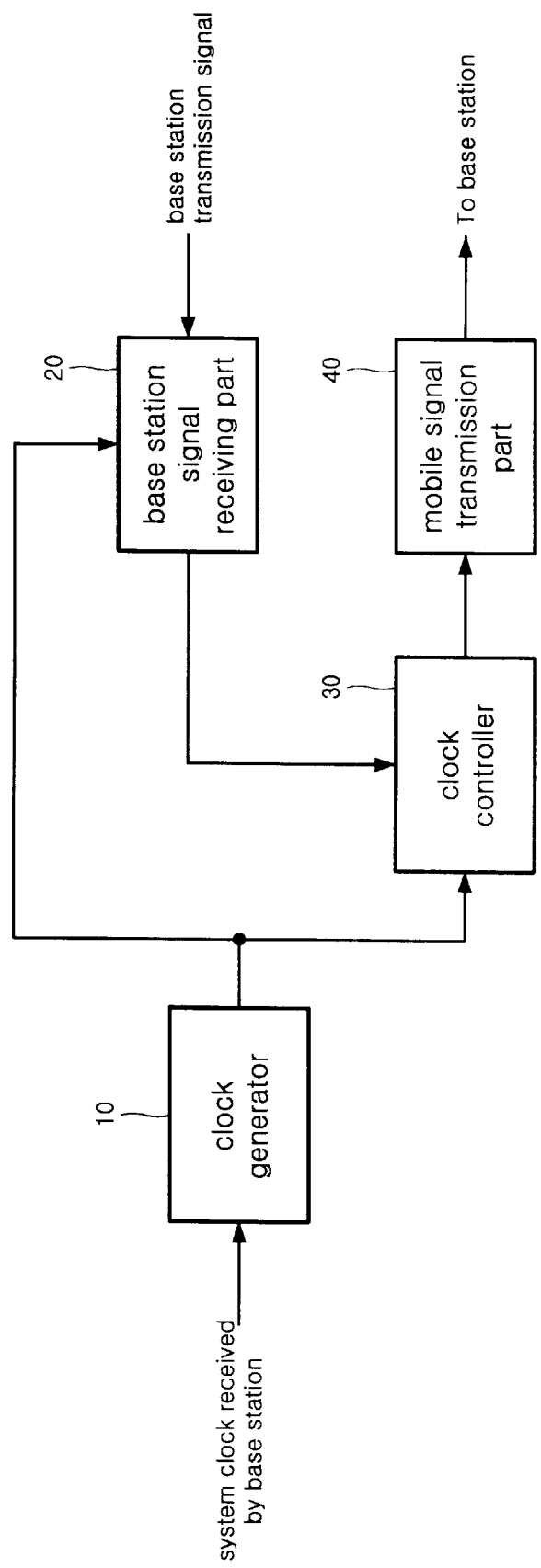
FIG. 1 is a block diagram of the apparatus for extending the service area in a mobile communication system according to the present invention.

FIG. 1 is a block diagram of the apparatus for extending the service area in a mobile communication system according to the present invention. Referring to FIG. 1, the apparatus includes a clock generator 10 for generating a clock, in the mobile station, required for reception signals from the base station and transmission signals from the mobile, a receiver 20 for receiving the signal from the base station, a clock controller 30 for delivering the clock generated by clock generator 10 to a transmitter 40 without applying any change thereto according to the signal received by receiver 20 or for controlling the clock to send it to transmitter 40, and transmitter 40 for transmitting the mobile signal, synchronizing with the clock obtained by clock controller 30.

Figure 2:
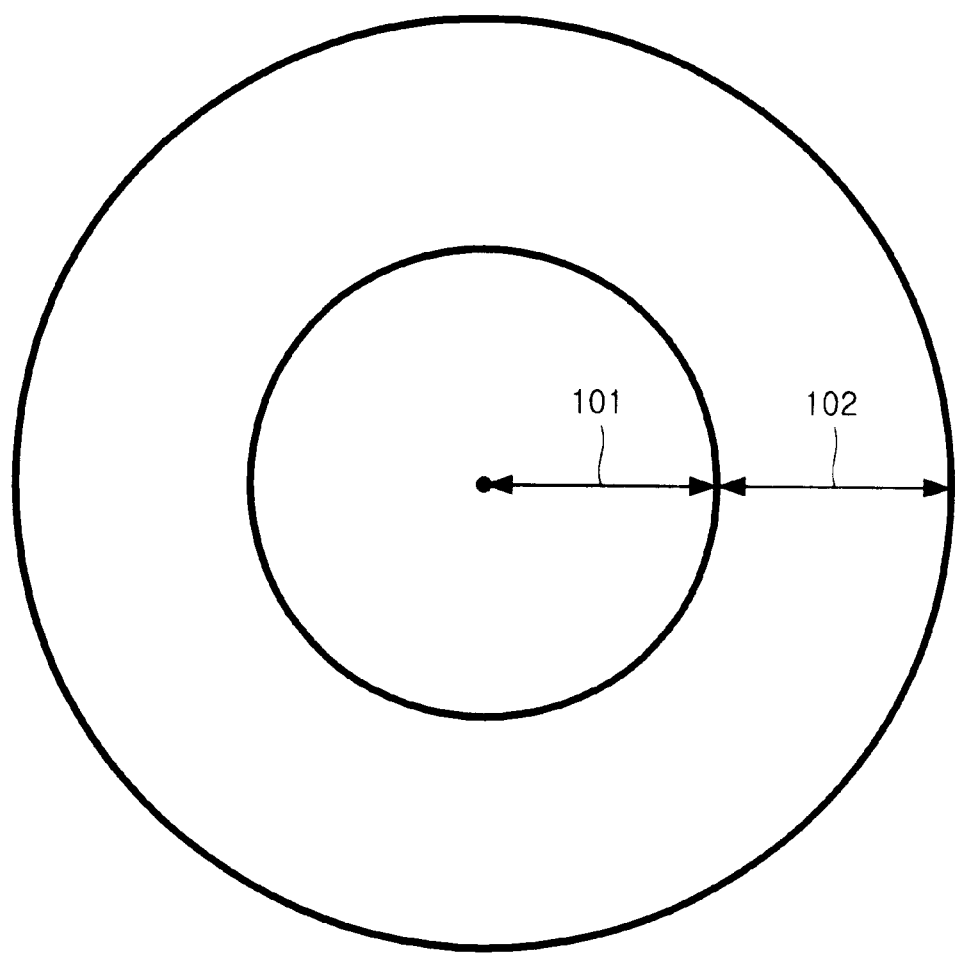
FIG. 2 is a diagram for explaining the basic service area and extended service area according to the present invention.

FIG. 2 is a diagram for explaining the normal mode and extension mode according to the present invention. In FIG. 2, reference numeral 101 indicates the operation area in the normal mode and 102 indicates that in the extension mode. The normal mode means the operation mode in an area where basic communication is available in a general mobile communication system, and the extension mode means the operation mode proposed by the present invention in order to perform communication even when the communication is carried out outside the basic communication area.

The apparatus for extending the service area according to the present invention first judges that the distance between the base station and mobile is included in area 101 of FIG. 2 when receiver 20 normally receives the signal transmitted from the base station, and sends a corresponding signal, that is, a signal indicating that the signal is normally received from the base station, to clock controller 30. Then, clock controller 30 operates in the normal mode. The operation of the normal mode is explained below.

clock generator 10 generates the clock required for the mobile to receive the signal transmitted from the base station and for transmitting the signal from the mobile. Clock controller 30 operates in the normal mode to transmit the clock generated by clock generator 10 to transmitter 40 without applying any variation thereto. Transmitter 40 then synchronizes with the transmitted clock to attempt access. At this time, receiver 20 continuously receives the signal transmitted from the base station through an antenna, and sends the information on the reception of the signal to clock controller 30.

After transmission of the access signal from the mobile to the base station through mobile signal transmitter 40, when receiver 20 does not receive the response signal corresponding to the access signal transmitted from the base station, that is, when the access fails, receiver 20 delivers information indicating the access fail to clock controller 30. Then, clock controller 30 converts its operation mode to the extension mode in order to extend the service area. Clock controller 30 being in the extension mode controls the clock generated by clock generator 10. Specifically, to compensate for the propagation delay, clock controller 30 advances the clock generated by clock generator 10 initial delay D_INIT initially set, and sends this controlled clock to transmitter 40. That is, clock controller 30 merely controls the clock to be advanced D_INIT and delivers it to transmitter 40.

Then, mobile signal transmitter 40 attempts the access again based on the controlled clock. Subsequently, receiver 20 receives the signal indicating the access result transmitted from the base station. clock controller 30 analyzes the access result signal and, when the access fails, advances the clock generated by clock generator 10 delay by steps D_STEP. Here, clock control executed by clock controller 30 is repeatedly performed a predetermined number of times. The controlled clock corresponds to a signal advanced from the original clock generated by clock generator 10 by D_INIT+D_STEP*N.

When receiver 20 receives the access response signal, it judges the access to be successful and maintains the currently controlled clock to carry out transmission and reception of data with the base station. That is, the clock which transmits the signal from the mobile is advanced in proportion to the distance between the mobile and base station so that the base station can search the signal transmitted from the mobile within a predetermined range of search window even when the distance between them is not included in the predetermined coverage area, thereby extending the service area.

Meanwhile, in case that the access fails even when clock controller 30 performed the aforementioned clock controlling operation a predetermined number of times (N) and mobile signal transmitter 40 attempted access by a predetermined number of times, a controller (not shown) which controls the entire operation of the mobile informs a corresponding subscriber of call fail and clock controller 30 converts the extension mode to the normal mode.

Figure 3:
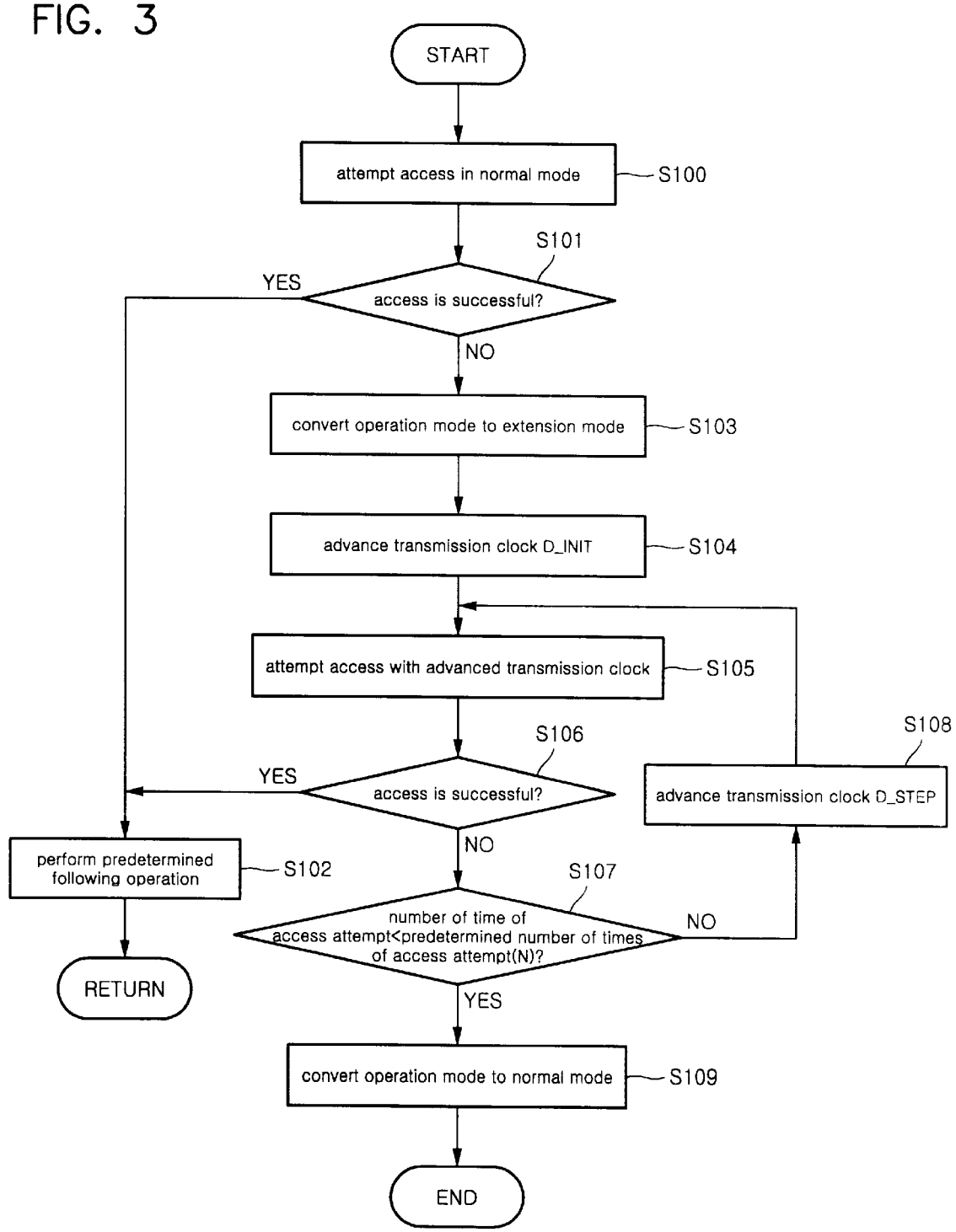
FIG. 3 is a flow diagram showing the method for extending the service area in a mobile communication system according to the present invention.

FIG. 3 is a flow diagram showing the method for extending the service area according to the present invention. Referring to FIG. 3, the method includes a step (S100) of attempting access in the normal mode, a step (S101) of confirming if the access is successful, a step (S102) of performing the next operation when the access is successful, a step (S103) of converting the operation mode to the extension mode when the access fails, a step (S104) of controlling the transmission clock to be advanced D_INIT in the extension mode, a step (S105) of attempting access with the controlled transmission clock, a step (S106) of confirming if the access is successful at step S105, a step (S107) of comparing the number of times of the access attempts that have been made so far with a predetermined number (N) of times of attempting access when the access fails at step S105, a step (SlO8) of controlling the transmission clock to be advanced D_STEP when the number of times of the access attempts is less than the predetermined number (N) of times and returning to step S105 where the access is attempted, and a step (S109) of converting the operation mode to the normal mode when the number of times of the access attempts is identical to or greater than the predetermined number (N) of times and completing the access attempt.

The method of extending the service area according to the present invention constructed as above is explained below in more detail. First of all, access is attempted in the normal mode (S100). Then, it is confirmed if the access is successful (S101), and a predetermined following operation is performed when the access is successful (S102). On the other hand, when the access fails, the operation mode is converted from the normal mode to the extension mode (S103) and the transmission clock is controlled to be advanced initial delay D_INIT in the extension mode (S104). Thereafter, the access is attempted again with the controlled transmission clock (S105).

It is confirmed if the access attempted in the step S105 is successful (S106) and, when the access fails, the number of times of the access attempt that have been made so far is compared with a predetermined number of times (N) of access attempt (S107). From the compared result, the transmission clock is controlled to be advanced delay by steps D_STEP when the number of times of the access attempt that have been made so far is less than the predetermined number of times (N), and the access is attempted again (S108). Here, an example of the delay time by steps D_STEP is as follows.

The first step: initial delay time+initial delay time

The second step: initial delay time+initial delay time+ initial delay time

The third step: initial delay time+initial delay time+initial delay time+initial delay time The fourth step: . . .

The fifth step: . . .

The Nth step: initial delay time * number of times (N)

When the number of times of the access attempts is identical to or greater than the predetermined number of times (N), the operation mode is converted from the extension mode to the normal mode and the access attempt is finished (S109).

According to the apparatus and method for extending the service area in a mobile communication system of the present invention described above, in case that the distance between the base station and mobile is not included in the basic coverage area, the present invention does not judge the call to fail but attempts the access with advancing the transmission clock by a predetermined period of time by stages, to enable the access attempt and calling, resulting in the extension of the service area. Furthermore, the extension of the serive area can reduce the number of base stations unnecessary in an area having a small number of subscribers. Moreover, the service area in the coastal zone can be extended to increase the range of the region where on-board mobile communication is available.

It will be apparent to those skilled in the art that various modifications and variations can be made in the apparatus and method for extending the service area in a mobile communication system of the present invention without departing from the spirit or scope of the invention. Thus, it is intended that the present invention cover the modifications and variations of this invention provided they come within the scope of the appended claims and their equivalents.

What is claimed is:

1. An apparatus for extending the service area in a mobile station of a CDMA mobile communication system, comprising:

means for generating a clock required for receiving a signal from a base station and transmitting a signal from a mobile station;

means for receiving the signal transmitted from the base station; and means for variably controlling the clock generated by the clock generating means according to the signal received by the receiving means, and sending the controlled clock to means for transmitting the signal from the mobile station.

2. The apparatus as claimed in claim 1, wherein the base station signal receiving means continuously receives the signal transmitted from the base station, and delivers a signal indicating whether a response signal for access attempt is received or not to the clock controlling means as an operation mode determining signal.

3. The apparatus as claimed in claim 1, wherein the clock controlling means operates in the normal mode and extension mode, and it delivers the clock generated by the clock generating means to the signal transmitting means of mobile station without applying any change thereto in the normal mode, and controls clock generated by the clock generating means to be set to the extension mode and sends it to the signal transmitting means of mobile station in the extension mode.

4. The apparatus as claimed in claim 3, wherein the normal mode is an operation mode in case that the distance between the base station and mobile station is included in a basic coverage area, and the extension mode is an operation mode in case that the distance between the base station and mobile station is not included therein.

5. The apparatus as claimed in claim 3, wherein, in case of the extension mode, the clock controlling means controls the transmission clock to be advanced a predetermined initial delay D_INIT at the initial stage, and controls the next transmission clock to be advanced a predetermined delay by steps D_STEP.

6. The apparatus as claimed in claim 5, wherein the delay by steps D_STEP corresponds to the result obtained by multiplying the number of times of repeating the access by the initial delay time.

7. A method for extending the service area in a mobile communication system, wherein a method of accessing a base station of a CDMA mobile communication system comprises:

a first step of attempting access in the normal operation mode;

a second step of performing a predetermined following operation when the access is successful, and converting the operation mode to the extension mode when the access fails;

a third step of varying a transmission clock by a predetermined level after the operation mode is converted to the extension mode, and attempting the access again; and a fourth step of carrying out a predetermined following operation when the access is successful in the third step, converting the operation mode to the normal mode when the access fails after the access is attempted a predetermined number of times and returning to the initial state.

8. The method as claimed in claim 7, wherein the normal mode is an operation mode in case that the distance between the base station and mobile station is included in a basic coverage area, and the extension mode is an operation mode in case that the distance between the base station and mobile station is not included therein.

9. The method as claimed in claim 7, wherein the third step comprises the sub-steps of:

controlling the mobile signal transmitting clock to be advanced by the initial delay time;

re-attempting the access with the controlled transmission clock, and comparing the number of times of that access attempts that have been made so far with a predetermined number of times of access attempt when the access fails;

controlling the transmission clock to be advanced by a predetermined level by steps when the number of times of the access attempts that have been made so far is less than the predetermined number of times, and then re-attempting the access with the controlled transmission clock; and repeating the control of the transmission clock's level and access attempt until the number of times of the access attempts becomes the predetermined number times when the reattempted access fails.

10. The method as claimed in claim 9, wherein the level by steps corresponds to the period of time obtained by multiplying the number of times of repeating the access by the initial delay and dividing the multiplied value by steps.

* * * * *